United States Patent
Arakawa

(10) Patent No.: US 9,756,206 B2
(45) Date of Patent: Sep. 5, 2017

(54) IMAGE FORMING APPARATUS

(71) Applicant: KYOCERA Document Solutions Inc., Osaka (JP)

(72) Inventor: Hiroki Arakawa, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/185,930

(22) Filed: Jun. 17, 2016

(65) Prior Publication Data
US 2016/0381242 A1 Dec. 29, 2016

(30) Foreign Application Priority Data

Jun. 23, 2015 (JP) ................................ 2015-125559

(51) Int. Cl.
*G06F 3/12* (2006.01)
*H04N 1/00* (2006.01)
*H04N 1/21* (2006.01)

(52) U.S. Cl.
CPC ..... *H04N 1/00915* (2013.01); *H04N 1/00307* (2013.01); *H04N 1/00954* (2013.01); *H04N 1/2104* (2013.01); *H04N 2201/0094* (2013.01)

(58) Field of Classification Search
None
See application file for complete search history.

(56) References Cited

U.S. PATENT DOCUMENTS

| 6,151,464 | A | * | 11/2000 | Nakamura | G03G 15/5091 399/79 |
| 9,473,661 | B2 | * | 10/2016 | Harada | H04N 1/00923 |
| 2004/0004735 | A1 | * | 1/2004 | Oakeson | G06F 3/1212 358/1.15 |
| 2008/0170256 | A1 | * | 7/2008 | Matsuhara | G06F 3/1207 358/1.15 |
| 2016/0127592 | A1 | * | 5/2016 | Nakamura | H04N 1/00923 358/1.13 |

FOREIGN PATENT DOCUMENTS

JP 2010-069769 4/2010

* cited by examiner

*Primary Examiner* — Dung Tran
(74) *Attorney, Agent, or Firm* — Stein IP, LLC

(57) ABSTRACT

An image forming apparatus recognizes a requesting user who has requested execution of a printing job stored in a memory portion, and in a case where a distance between a mobile terminal owned by the requesting user and the image forming apparatus has become not more than a first threshold value, the image forming apparatus performs control so that interrupt printing is performed in which the printing job of the requesting user is started, and so that another printing job is not resumed until a prescribed time length has elapsed after completion of the printing job of the requesting user.

6 Claims, 4 Drawing Sheets

IMAGE FORMING APPARATUS

INCORPORATION BY REFERENCE

This application is based upon and claims the benefit of priority from the corresponding Japanese Patent Application No. 2015-125559 filed on Jun. 23, 2015, the entire contents of which are incorporated herein by reference.

BACKGROUND

The present disclosure relates to an image forming apparatus that is capable of executing a printing job.

Upon receiving a request to execute a new printing job, unless another printing job is being executed, an image forming apparatus immediately executes the new printing job. In a case, however, where a request to execute a new printing job is received while a preceding printing job is being executed, however, the image forming apparatus withholds the new printing job from being executed. That is, the new printing job is placed in a standby state.

The printing job that has been withheld from being executed and thus been placed in the standby state is not executed until the preceding printing job is completed. Then, when there is established a state where no printing job is being executed in the image forming apparatus, the printing job that has been in the standby state is executed.

SUMMARY

An image forming apparatus of the present disclosure has a printing portion, a paper ejection tray, a memory portion, a communication portion, and a control portion. The printing portion executes a printing job. Printed matter obtained by executing a printing job is ejected on the paper ejection tray. The memory portion stores a printing job that is withheld from being executed. The communication portion performs communication with a mobile terminal owned by a user. The control portion recognizes a requesting user who has requested execution of the printing job stored in the memory portion and performs communication with the mobile terminal owned by the requesting user via the communication portion so as to detect a distance between the mobile terminal owned by the requesting user and the image forming apparatus. In a case where the distance between the mobile terminal owned by the requesting user and the image forming apparatus has become not more than a first threshold value while a printing job other than the printing job of the requesting user stored in the memory portion is being executed, the control portion performs control so that the printing portion executes interrupt printing in which execution of the other printing job is interrupted to start the printing job of the requesting user, and so that the other printing job is not resumed until a prescribed time length has elapsed after completion of the printing job of the requesting user.

DETAILED DESCRIPTION

By using a multi-functional peripheral equipped with a plurality of types of functions including a printing function as an example, the following describes an image forming apparatus according to one embodiment of the present disclosure. That is, an image forming apparatus 100 described below is an apparatus that is capable of executing a printing job.

<Overall Configuration of Image Forming Apparatus>

Figure 1:
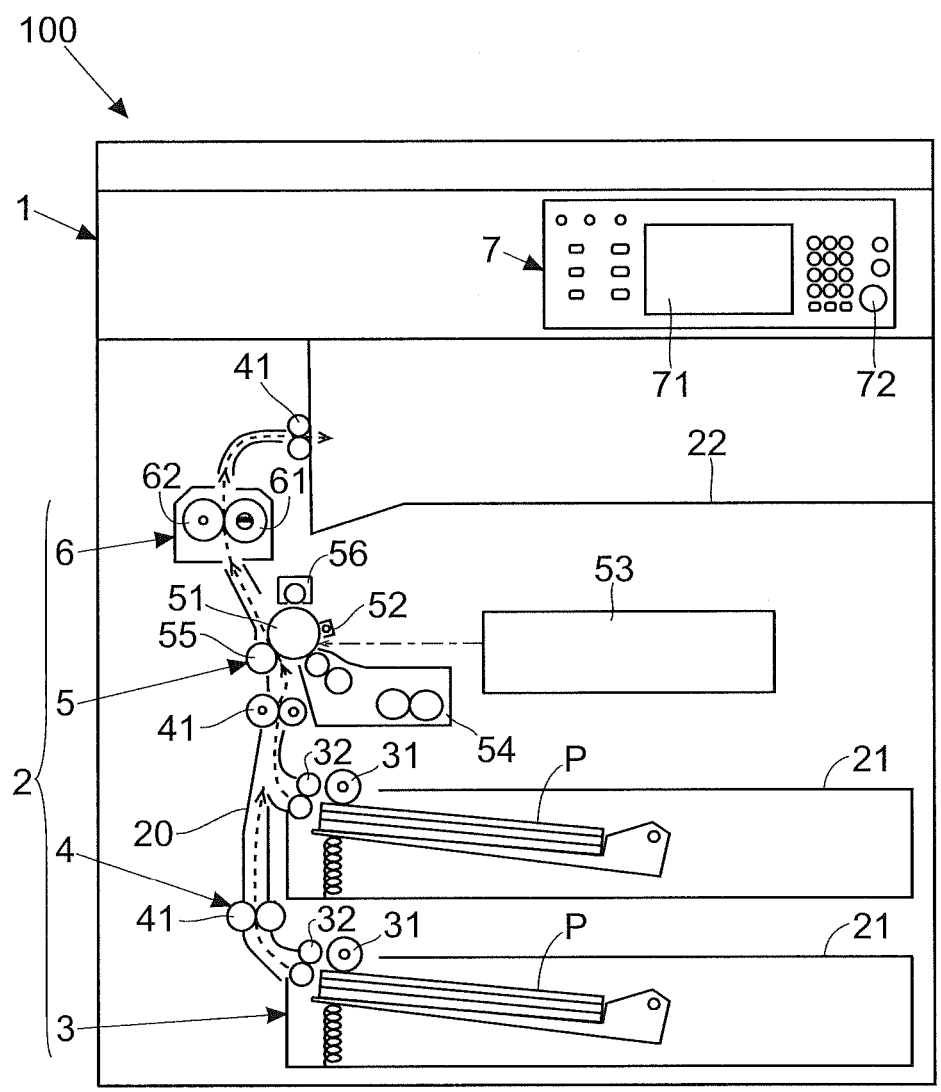
FIG. 1 is a diagram showing a configuration of an image forming apparatus according to one embodiment of the present disclosure.

As shown in FIG. 1, the image forming apparatus 100 has an image reading portion 1 and a printing portion 2. The image reading portion 1 reads an original document and, based thereon, generates image data. The printing portion 2 is a mechanism portion that executes a printing job. While conveying a paper sheet P along a paper sheet conveyance path 20, based on the image data, the printing portion 2 forms a toner image. Then, the printing portion 2 prints the toner image on the paper sheet P that is being conveyed.

The printing portion 2 is composed of a paper feed portion 3, a paper sheet conveyance portion 4, an image forming portion 5, and a fixing portion 6. The paper feed portion 3 includes a pick-up roller 31 and a paper feed roller pair 32 and supplies the paper sheet P housed in a paper sheet cassette 21 to the paper sheet conveyance path 20. The paper sheet conveyance portion 4 includes a plurality of conveyance roller pairs 41 and conveys the paper sheet P along the paper sheet conveyance path 20.

The image forming portion 5 includes a photosensitive drum 51, a charging device 52, an exposure device 53, a development device 54, a transfer roller 55, and a cleaning device 56. Further, based on image data, the image forming portion 5 forms a toner image, and transfers the toner image onto the paper sheet P. The fixing portion 6 includes a heating roller 61 and a pressing roller 62 and heats and presses the toner image thus transferred onto the paper sheet P so that the toner image is fixed onto the paper sheet P.

After having passed through the fixing portion 6, the paper sheet P on which printing has thus been performed (printed matter) is conveyed along the paper sheet conveyance path 20 by the paper sheet conveyance portion 4. Then, the printed paper sheet P is eventually ejected on the paper ejection tray 22. When, in a state where a preceding printed paper sheet P has already been ejected on the paper ejection tray 22 (in a state where the preceding printed paper sheet P remains on the paper ejection tray 22), a succeeding printed paper sheet P is ejected on the paper ejection tray 22, the succeeding printed paper sheet P is stacked on the preceding printed paper sheet P.

Furthermore, in the image forming apparatus 100, an operation panel 7 is installed. The operation panel 7 includes a touch panel display 71. The touch panel display 71 displays soft keys, messages, and so on and accepts a touch operation with respect to the soft keys (an operation for performing various types of setting related to the image forming apparatus 100). Furthermore, on the operation panel 7, hard keys 72 such as a start key and a numeric keypad also are provided. The operation panel 7 corresponds to a "display portion".

<Hardware Configuration of Image Forming Apparatus>

Figure 2:
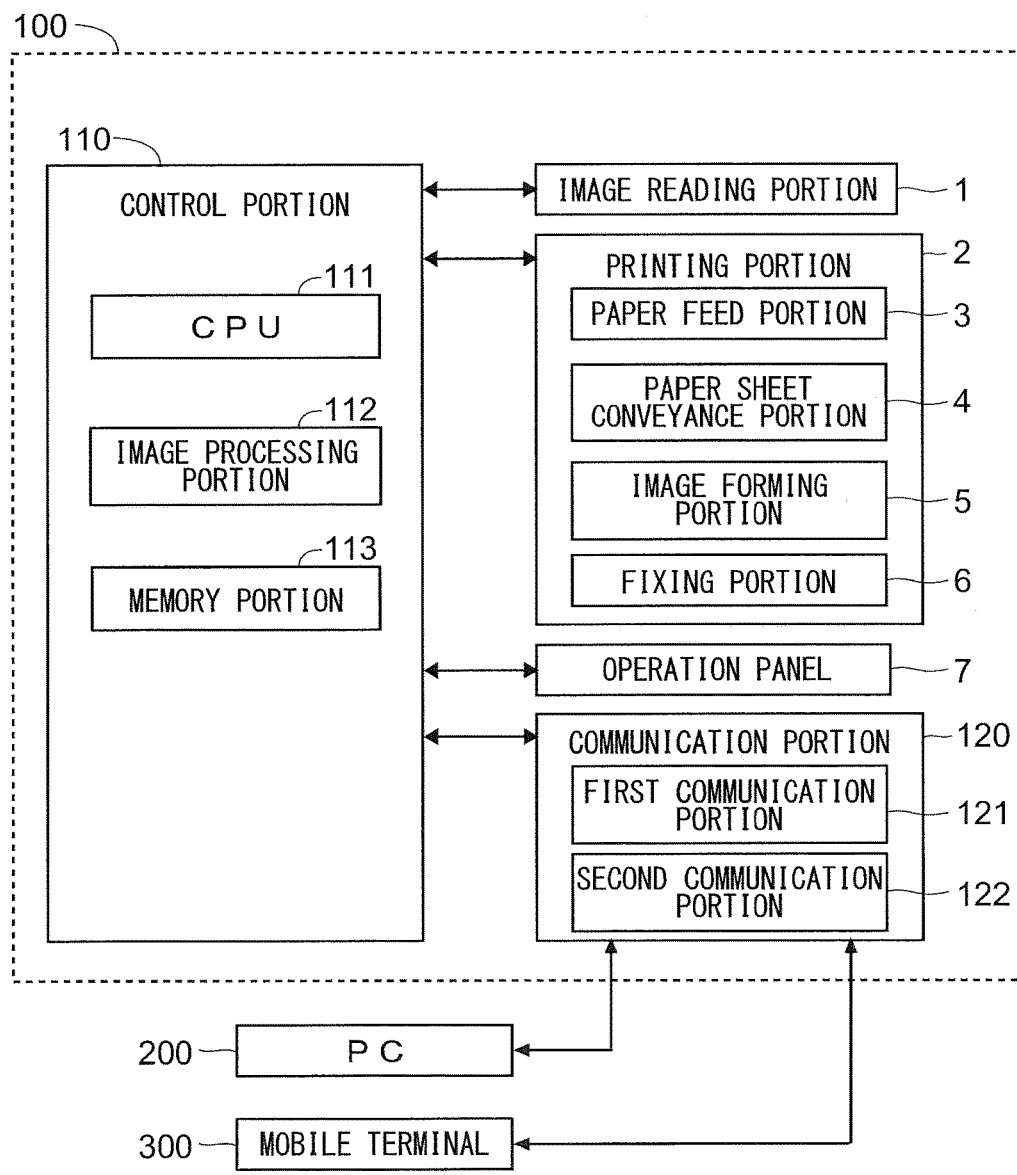
FIG. 2 is a diagram showing a hardware configuration of the image forming apparatus according to the one embodiment of the present disclosure.

As shown in FIG. 2, the image forming apparatus 100 has a control portion 110. The control portion 110 includes a CPU 111, an image processing portion 112, and a memory portion 113. The image processing portion 112 is formed of, for example, an ASIC dedicated to image processing and subjects image data to various types of image processing (enlargement/reduction, concentration conversion, data format conversion, and so on). The memory portion 113 is composed of a ROM, a RAM, an HDD, and so on. In the memory portion 113, control programs and data are stored. Further, based on the control programs and data stored in the memory portion 113, the control portion 110 controls operations of the various portions of the image forming apparatus 100.

To be specific, the control portion 110 is connected to the image reading portion 1 to control a reading operation of the image reading portion 1. Furthermore, the control portion 110 is connected to the printing portion 2 (the paper feed portion 3, the paper sheet conveyance portion 4, the image forming portion 5, and the fixing portion 6) to control a printing operation of the printing portion 2. Moreover, the control portion 110 is connected to the operation panel 7 to control a display operation of the operation panel 7 and to detect an operation performed with respect to the operation panel 7.

Furthermore, the control portion 110 is connected to a communication portion 120. The communication portion 120 includes, for example, a first communication portion 121 and a second communication portion 122. The first communication portion 121 is communicably connected to a personal computer 200 (hereinafter, referred to as a PC 200) via a network such as a LAN (local area network). The PC 200 is used by a user of the image forming apparatus 100 and is a notebook or desktop personal computer. The LAN is connected to an external network such as the Internet via communication equipment such as a router.

Here, in a case where the image forming apparatus 100 is used as a printer, a user creates, by using the PC 200, image data of an image of a document or the like and, via the PC 200, requests the image forming apparatus 100 to execute a printing job. For example, the PC 200 displays a printing setting screen (not shown) to accept setting of a printing condition (for example, the number of printed copies to be made, a paper sheet size, or the like). Then, a prescribed icon (an icon for accepting a request to execute a printing job) disposed within a screen of the printing setting screen is operated, and thus it is possible to request the image forming apparatus 100 to execute the printing job.

Upon receiving the operation with respect to the prescribed icon, the PC 200 generates job data of the printing job and transmits the job data of the printing job to the image forming apparatus 100. For example, job data of a printing job includes image data of an image to be printed, a printing condition, a request to execute the printing job, user information of a user who has requested execution of the printing job, and so on.

The printing job transmitted from the PC 200 is received by the first communication portion 121. Then, the control portion 110 checks the job data of the printing job and controls the printing portion 2 to execute the printing job based on said job data.

The second communication portion 122 is intended to perform communication pursuant to a wireless communication standard such as Bluetooth (registered trademark). For example, the second communication portion 122 performs wireless communication with a mobile terminal 300 owned by a user. Though there is no particular limitation, the mobile terminal 300 is a smart phone, a mobile phone, or the like.

<Detection of Distance between Image Forming Apparatus and Mobile Terminal>

In the image forming apparatus 100, an ID of the mobile terminal 300 owned by a user is registered. For example, in the memory portion 113, the ID of the mobile terminal 300 is stored so as to correspond to user information of an owner user (one piece of information added to job data of a printing job). Then, via the second communication portion 122, the control portion 110 performs communication with the mobile terminal 300 registered in the image forming apparatus 100.

Here, the control portion 110 performs communication with the mobile terminal 300 via the second communication portion 122 so as to detect a distance between the image forming apparatus 100 and the mobile terminal 300. As will be described in detail later, for the purpose of measuring start timing of a printing job in a standby state stored in the memory portion 113, detection of a distance between the image forming apparatus 100 and the mobile terminal 300 is performed.

As one example, in a case where the mobile terminal 300 is equipped with a GPS (global positioning system) function, the control portion 110 obtains, from the mobile terminal 300, terminal location information indicating a current location (coordinates) of the mobile terminal 300. Then, based on self-apparatus location information indicating a location (coordinates) of a self-apparatus and the terminal location information, the control portion 110 detects a distance between the image forming apparatus 100 and the mobile terminal 300. In this case, the self-apparatus location information is pre-stored in the memory portion 113.

As another example, via the communication portion 120 (second communication portion 122), the control portion 110 performs wireless communication with the mobile terminal 300. Then, based on a radio field intensity between the communication portion 120 and the mobile terminal 300, the control portion 110 detects a distance between the image forming apparatus 100 and the mobile terminal 300.

A configuration may be adopted in which a distance between the image forming apparatus 100 and the mobile terminal 300 is determined at the mobile terminal 300, and distance information indicating a distance between the mobile terminal 300 and the image forming apparatus 100 is transmitted from the mobile terminal 300 to the image forming apparatus 100. That is, detection of the distance may be performed based on distance information from the mobile terminal 300.

<Control in Executing Printing Job in Standby State>

In a case where a request to execute a new printing job is received while a preceding printing job is being executed, the control portion 110 performs control so that the new printing job is withheld and brought into a standby state. The printing job in the standby state is stored in the memory portion 113.

Furthermore, based on user information contained in job data of the printing job in the standby state stored in the memory portion 113, the control portion 110 recognizes a requesting user who has requested execution of the printing job in the standby state. In the following description, a requesting user who has requested execution of a printing job in a standby state (a printing job stored in the memory portion 113) may be referred to simply as a requesting user.

Moreover, the control portion 110 performs communication with the mobile terminal 300 owned by the requesting user (the mobile terminal 300 having an ID corresponding to the user information of the requesting user) so as to detect a distance between the mobile terminal 300 owned by the requesting user and the image forming apparatus 100. Then, based on a result of the detection of the distance, the control portion 110 measures start timing of the printing job of the requesting user (the printing job in the standby state stored in the memory portion 113).

Here, the control portion 110 sets a first threshold value (threshold distance) for measuring start timing of the printing job of the requesting user. When setting the first threshold value, based on the job data of the printing job of the requesting user, the control portion 110 checks the number of printed sheets to be obtained by the printing job of the requesting user (the number of paper sheets on which an image is to be printed). Then, the control portion 110 sets the first threshold value to be larger as the number of printed sheets to be obtained by the printing job of the requesting user increases. That is, the first threshold value is not a fixed value but is a value varying depending on the number of printed sheets to be obtained by a printing job of a requesting user.

For example, in the memory portion 113, threshold value setting information for setting the first threshold value is stored. In the threshold value setting information, the number of printed sheets to be obtained is categorized into a plurality of levels, and a value of the first threshold value corresponding to each of the levels is preset to be larger as the number of printed sheets to be obtained increases. Then, based on the threshold value setting information, the control portion 110 determines a value of the first threshold value corresponding to the number of printed sheets to be obtained by the printing job of the requesting user and, by using said value of the first threshold value thus determined, measures the start timing of the printing job of the requesting user.

As one example, in the threshold value setting information, a value of the first threshold value is set to 15 m in a case where the number of printed sheets to be obtained is not less than ten, 10 m in a case where the number of printed sheets to be obtained is six to nine, and 5 m in a case where the number of printed sheets to be obtained is one to five. Contents defined in the threshold value setting information can be arbitrarily changed. For example, a change to the threshold value setting information is accepted by the operation panel 7. Or alternatively, a configuration may be adopted in which a change to the threshold value setting information can be made from the PC 200.

A configuration may be adopted in which a job execution time length expected to be required from a start of a printing job of a requesting user to completion thereof is determined, and the first threshold value is set based on the job execution time length. In this case, the control portion 110 sets the first threshold value to be larger as the job execution time length of the printing job of the requesting user increases.

Upon the first threshold value being set, the control portion 110 judges whether or not the distance between the mobile terminal 300 owned by the requesting user and the image forming apparatus 100 has become not more than the first threshold value. Then, upon judging that the distance between the mobile terminal 300 owned by the requesting user and the image forming apparatus 100 has become not more than the first threshold value, the control portion 110 controls the printing portion 2 to start execution of the printing job of the requesting user (the printing job in the standby state stored in the memory portion 113) owning the mobile terminal 300, the distance of which from the image forming apparatus 100 has become not more than the first threshold value. At this time, even when a preceding printing job is being executed, the control portion 110 performs control so that the printing job of the requesting user is executed on a priority basis.

That is, in a case where a distance between the mobile terminal 300 owned by a requesting user and the image forming apparatus 100 has become not more than the first threshold value while a preceding printing job is being executed, the control portion 110 interrupts the preceding printing job. Then, the control portion 110 controls the printing portion 2 to start execution of a printing job of the requesting user (controls the printing portion 2 to execute interrupt printing).

While the printing job of the requesting user is being executed, the control portion 110 performs control so that interrupt printing with respect to the printing job of the requesting user is not executed. Thus, unless an error such as a paper jam occurs, in no case is the printing job of the requesting user interrupted.

Moreover, the control portion 110 performs control so that, even after completion of the printing job of the requesting user, the printing job (preceding printing job) that has been interrupted as a result of executing the interrupt printing is not immediately resumed. For example, the control portion 110 performs control so that the printing job that has been interrupted is not resumed until a prescribed time length (for example, several seconds to several tens of seconds) has elapsed after the completion of the printing job of the requesting user. Thus, until the prescribed time length has elapsed after the completion of the printing job of the requesting user, there is maintained a state where printed matter obtained by the printing job of the requesting user has been ejected to be stacked on top on the paper ejection tray 22. Then, upon a lapse of the prescribed time length after the completion of the printing job of the requesting user, the control portion 110 performs control so that the printing job that has been interrupted is resumed.

Figure 3:
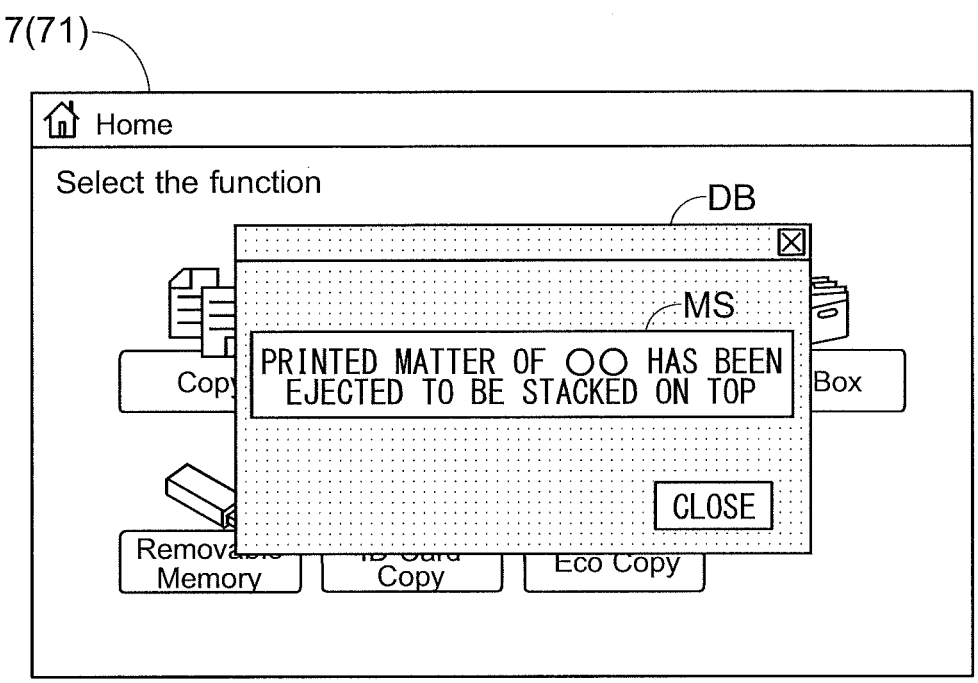
FIG. 3 is a diagram showing a screen displayed on an operation panel of the image forming apparatus according to the one embodiment of the present disclosure.

Furthermore, on and after the completion of the printing job of the requesting user, the control portion 110 controls the operation panel 7 to provide a notification that the printed matter obtained by the printing job of the requesting user has been ejected to be stacked on top on the paper ejection tray 22. Upon receiving an instruction from the control portion 110, the operation panel 7 displays a notification message MS (corresponding to "notification information") as shown in FIG. 3. At this time, a dialogue box DB in which the notification message MS is disposed may be displayed in a pop-up form. In "○ ○" shown in FIG. 3, the user information (for example, a user name or the like) of the requesting user is inserted.

For example, on and after the completion of the printing job of the requesting user, in a case where the distance between the mobile terminal 300 owned by the requesting user and the image forming apparatus 100 has become not more than a second threshold value that is smaller than the first threshold value, the control portion 110 controls the operation panel 7 to display the notification message MS. Though there is no particular limitation, the second threshold value is set to not more than 1 m. That is, when there is established a state where the requesting user can check contents on a display screen of the operation panel 7 (a state where the requesting user has reached the image forming apparatus 100), the notification message MS is displayed on the operation panel 7.

In a case where the distance between the mobile terminal 300 owned by the requesting user and the image forming apparatus 100 has not become not more than the second threshold value, there is no need to display the notification message MS. Or alternatively, a configuration may be adopted in which, regardless of whether or not the distance between the mobile terminal 300 owned by a requesting user and the image forming apparatus 100 has become not more than the second threshold value, upon completion of a printing job of the requesting user, the notification message MS is displayed.

Figure 4:
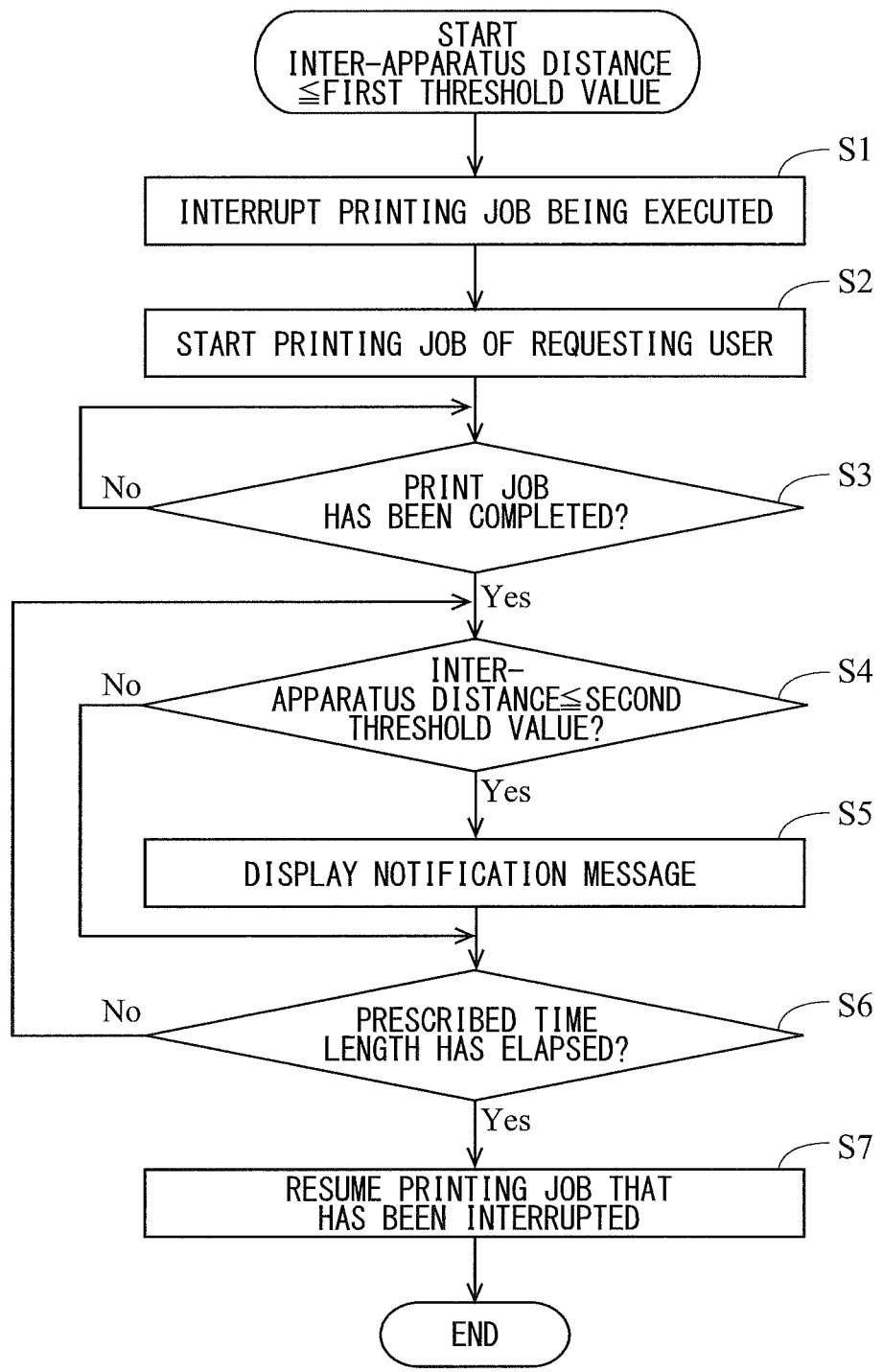
FIG. 4 is a flow chart for explaining a flow of control in a case where interrupt printing of a printing job of a requesting user (a printing job in a standby state) is executed in the image forming apparatus according to the one embodiment of the present disclosure.

With reference to a flow chart shown in FIG. 4, the following describes a flow of control in a case of executing interrupt printing of a printing job of a requesting user. It is assumed that, at a start point in time in the flow chart shown in FIG. 4, a printing job in a standby state is stored in the memory portion 113. It is also assumed that a preceding printing job is being executed. Further, when a distance between the mobile terminal 300 owned by the requesting user and the image forming apparatus 100 (inter-apparatus distance) has become not more than the first threshold value, the flow chart shown in FIG. 4 is started.

At Step S1, the control portion 110 interrupts the printing job (preceding printing job) that is being executed. Subsequently, at Step S2, the control portion 110 controls the printing portion 2 to start the printing job of the requesting user owning the mobile terminal 300, the distance of which from the image forming apparatus 100 has become not more than the first threshold value. That is, the printing portion 2 executes interrupt printing.

Next, at Step S3, the control portion 110 judges whether or not the printing job of the requesting user has been completed. In a case where the control portion 110 results in judging that the printing job of the requesting user has been completed, a transition is made to Step S4, while in a case where the control portion 110 results in judging that the printing job of the requesting user has not been completed, the judgment at Step S3 is repeatedly performed.

Upon the transition to Step S4, the control portion 110 judges whether or not the distance between the mobile terminal 300 owned by the requesting owner and the image forming apparatus 100 (inter-apparatus distance) has become not more than the second threshold value. In a case where the control portion 110 results in judging that the inter-apparatus distance has become not more than the second threshold value, a transition is made to Step S5.

Upon the transition to Step S5, the control portion 110 controls the operation panel 7 to display the notification message MS (see FIG. 3). After that, a transition is made to Step S6. Also in a case where, at Step S4, the control portion 110 judges that the inter-apparatus distance has not become not more than the second threshold value, a transition is made to Step S6.

Upon the transition to Step S6, the control portion 110 judges whether or not a prescribed time length has elapsed after the completion of the printing job of the requesting user. In a case where the control portion 110 results in judging that the prescribed time length has elapsed, a transition is made to Step S7, while in a case where the control portion 110 results in judging that the prescribed time length has not elapsed yet, a transition is made to Step S4.

Upon the transition to Step S7, the control portion 110 controls the printing portion 2 to resume the printing job that has been interrupted. At this time, in a case where the operation panel 7 is displaying the notification message MS, the notification message MS is stopped from being displayed.

Assuming that the preceding printing job has been completed before the distance between the mobile terminal 300 owned by the requesting user and the image forming apparatus 100 (inter-apparatus distance) becomes not more than the first threshold value, without waiting for the inter-apparatus distance to become not more than the first threshold value, following the completion of the preceding printing job, the printing job of the requesting user is started. A configuration also may be adopted, however, in which even in a case where the preceding printing job has been completed before the inter-apparatus distance becomes not more than the first threshold value, after the inter-apparatus distance has become not more than the first threshold value, the printing job of the requesting user is started.

Furthermore, the following configuration may be adopted. That is, even in a case where a request to execute a new printing job is received in a state where no printing job is being executed in the image forming apparatus 100, the new printing job is brought to a standby state, and when a distance between the mobile terminal 300 owned by a requesting user who has requested execution of the printing job and the image forming apparatus 100 has become not more than the first threshold value, the printing job of the requesting user is started.

Furthermore, a configuration may be adopted in which an interrupt printing execution allowable maximum number of printed sheets to be obtained (upper limit number of printed sheets to be obtained) is preset, and in a case where the number of printed sheets to be obtained by a printing job of a requesting user exceeds the upper limit number of printed sheets to be obtained, interrupt printing to perform the printing job of the requesting user is not executed. In this case, when the number of printed sheets to be obtained by a printing job of a requesting user exceeds the upper limit number of printed sheets to be obtained, after completion of a preceding printing job, the printing job of the requesting user is started.

As described above, the image forming apparatus 100 of this embodiment has the printing portion 2 that executes a printing job, the paper ejection tray 22 on which printed matter obtained by executing a printing job is ejected, the memory portion 113 in which a printing job that is withheld from being executed is stored, the communication portion 120 for performing communication with the mobile terminal 300 owned by a user, and the control portion 110 that recognizes a requesting user who has requested execution of the printing job stored in the memory portion 113 and performs communication with the mobile terminal 300 owned by the requesting user via the communication portion 120 so as to detect a distance between the mobile terminal 300 owned by the requesting user and the image forming apparatus 100. Further, in a case where the distance between the mobile terminal 300 owned by the requesting user and the image forming apparatus 100 has become not more than the first threshold value while a printing job (preceding printing job) other than the printing job of the requesting user stored in the memory portion 113 is being executed, the control portion 110 performs control so that the printing portion 2 executes interrupt printing in which execution of the other printing job is interrupted to start the printing job of the requesting user, and so that the other printing job is not resumed until a prescribed time length has elapsed after completion of the printing job of the requesting user.

In the configuration of this embodiment, in a case where, in order to collect printed matter, a requesting user approaches the image forming apparatus 100 so that a distance between the mobile terminal 300 owned by the requesting user and the image forming apparatus 100 has become not more than the first threshold value, a printing job of the requesting user is started. At this time, even when being executed, another printing job (preceding printing job) is interrupted, and the printing job of the requesting user is started on a priority basis (interrupt printing is executed). Thus, a requesting user who has come to collect printed matter can obtain the printed matter without much waiting time.

Furthermore, in the configuration of this embodiment, another printing job is not resumed until a prescribed time length has elapsed after completion of executing a printing job of a requesting user. That is, until the prescribed time length has elapsed after the completion of executing the printing job of the requesting user, there is maintained a state where printed matter obtained by the printing job of the requesting user has been ejected to be stacked on top on the paper ejection tray 22. This facilitates a requesting user's work to take out the printed matter obtained by the printing job.

As a result of these features, in this embodiment, an improvement is achieved in convenience of a user who has come to collect printed matter.

Here, in some cases, even though printed matter obtained by a printing job of a requesting user has been ejected to be stacked on top on the paper ejection tray 22, the requesting user may fail to notice that fact. In order to prevent this, on and after completion of executing the printing job of the requesting user, the control portion 110 controls the operation panel 7 to display the notification message MS (notification information) for providing a notification that the printed matter obtained by the printing job of the requesting user has been ejected to be stacked on top on the paper ejection tray 22. Providing such a notification easily allows a requesting user to recognize that printed matter that has been ejected to be stacked on top on the paper ejection tray 22 is his/her desired printed matter.

In a case where a requesting user is not near the image forming apparatus 100, even when the notification message MS is displayed, the notification message MS is not acknowledged by the requesting user. That is, in this case, there is no need to bother to display the notification message MS. For this reason, in a case where a distance between the mobile terminal 300 owned by the requesting user and the image forming apparatus 100 has become not more than the second threshold value that is smaller than the first threshold value, the control portion 110 performs control so that the notification message MS is displayed. In other words, in a case where the distance between the mobile terminal 300 owned by the requesting user and the image forming apparatus 100 is larger than the second threshold value (in a case where the requesting user is not near the image forming apparatus 100), the notification message MS is not displayed. This can suppress useless display of the notification message MS.

Furthermore, while a printing job of a requesting user is being executed, the control portion 110 performs control so that interrupt printing with respect to the printing job of the requesting user is not executed. By this configuration, in no case is a printing job of a requesting user interrupted, and thus the printing job of the requesting user is completed promptly. This can suppress occurrence of inconvenience that, when a requesting user who has come to collect printed matter has already reached the image forming apparatus 100, a printing job of the requesting user has not been completed yet.

Furthermore, the control portion 110 checks the number of printed sheets to be obtained by a printing job of a requesting user and sets the first threshold value to be larger as said checked number of printed sheets to be obtained increases. By this configuration, in a case where the number of printed sheets to be obtained by a printing job of a requesting user is large (a case where a time length required from a start of the printing job to completion thereof is long), compared with a case where the number of printed sheets to be obtained by the printing job of the requesting user is small (a case where the time length required from a start of the printing job to completion thereof is short), start timing of the printing job of the requesting user occurs earlier. That is, in a case where the number of printed sheets to be obtained by a printing job of a requesting user is small, at a point in time when a distance between the requesting user (mobile terminal 300) and the image forming apparatus 100 has reached a first distance that is relatively small, the printing job of the requesting user is started, while in a case where the number of printed sheets to be obtained by the printing job of the requesting user is large, at a point in time when the distance between the requesting user (mobile terminal 300) and the image forming apparatus 100 has reached a second distance that is larger than the first distance, the printing job of the requesting user is started. Thus, even in a case where the number of printed sheets to be obtained by a printing job of a requesting user is large and thus a time length required to complete the printing job is long, it is possible to suppress occurrence of inconvenience that, when a requesting user who has come to collect printed matter has already reached the image forming apparatus 100, a printing job of the requesting use has not been completed yet.

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

What is claimed is:

1. An image forming apparatus, comprising:
   a printing portion that executes a printing job;
   a paper ejection tray on which printed matter obtained by executing a printing job is ejected;
   a memory portion in which a printing job that is withheld from being executed is stored;
   a communication interface for performing communication with a mobile terminal owned by a user; and
   a control portion comprising a CPU and a memory, that recognizes a requesting user who has requested execution of the printing job stored in the memory portion and performs communication with the mobile terminal owned by the requesting user via the communication interface so as to detect a distance between the mobile terminal owned by the requesting user and the image forming apparatus,
   wherein
   in a case where, in a state communicable with the mobile terminal, the distance between the mobile terminal owned by the requesting user and the image forming apparatus has become not more than a first threshold value set based on information on the printing job of the requesting user while a printing job other than the printing job of the requesting user stored in the memory portion is being executed, the control portion performs control so that the printing portion interrupts execution of the other printing job and starts the printing job of the requesting user, and so that the other printing job is not resumed until a prescribed time length has elapsed after completion of the printing job of the requesting user.

2. The image forming apparatus according to claim 1, further comprising:
a display portion for displaying information,
wherein on and after completion of the printing job of the requesting user, the control portion controls the display portion to display notification information for providing a notification that printed matter obtained by the printing job of the requesting user has been ejected to be stacked on top on the paper ejection tray.

3. The image forming apparatus according to claim 2, wherein
in a case where the distance between the mobile terminal owned by the requesting user and the image forming apparatus has become not more than a second threshold value that is smaller than the first threshold value, the control portion controls the display portion to display the notification information.

4. The image forming apparatus according to claim 1, wherein
the information used to set the first threshold value is a job execution time length expected to be required from a start of the printing job of the requesting user to completion thereof, and
the control portion determines the job execution time length and sets the first threshold value to be larger as the job execution time length increases.

5. The image forming apparatus according to claim 1, wherein
in a case where a number of sheets to be printed by the printing job of the requesting user exceeds a preset upper limit number of sheets to be printed, the control portion performs control so that the printing job other than the printing job of the requesting user is not interrupted, and after completion of the printing job other than the printing job of the requesting user, the printing job of the requesting user is started.

6. An image forming apparatus, comprising:
a printing portion that executes a printing job;
a paper ejection tray on which printed matter obtained by executing a printing job is ejected;
a memory portion in which a printing job that is withheld from being executed is stored;
a communication interface for performing communication with a mobile terminal owned by a user; and
a control portion comprising a CPU and a memory, that recognizes a requesting user who has requested execution of the printing job stored in the memory portion and performs communication with the mobile terminal owned by the requesting user via the communication interface so as to detect a distance between the mobile terminal owned by the requesting user and the image forming apparatus,
wherein
in a case where the distance between the mobile terminal owned by the requesting user and the image forming apparatus has become not more than a first threshold value set based on a number of sheets to be printed by the printing job of the requesting user while a printing job other than the printing job of the requesting user stored in the memory portion is being executed, the control portion performs control so that the printing portion executes interrupt printing in which execution of the other printing job is interrupted to start the printing job of the requesting user, and so that the other printing job is not resumed until a prescribed time length has elapsed after completion of the printing job of the requesting user, and
the control portion checks the number of sheets to be printed by the printing job of the requesting user and sets the first threshold value to be larger as the checked number of sheets to be printed increases.

* * * * *